(12) United States Patent
Kaibara

(10) Patent No.: US 8,411,152 B2
(45) Date of Patent: Apr. 2, 2013

(54) FILE MANAGEMENT APPARATUS AND CONTROL METHOD THEREOF

(75) Inventor: Hiroshi Kaibara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 12/755,906

(22) Filed: Apr. 7, 2010

(65) Prior Publication Data

US 2010/0265351 A1  Oct. 21, 2010

(30) Foreign Application Priority Data

Apr. 15, 2009 (JP) ................................. 2009-099404

(51) Int. Cl.
- H04N 5/225 (2006.01)
- H04N 5/76 (2006.01)
- H04B 7/00 (2006.01)

(52) U.S. Cl. .............. 348/207.99; 348/231.99; 455/66.1

(58) Field of Classification Search .................... None
See application file for complete search history.

(56) References Cited

U.S. PATENT DOCUMENTS

| | | | | |
|---|---|---|---|---|
| 5,848,420 A | * | 12/1998 | Xu | ......................... 1/1 |
| 5,899,581 A | * | 5/1999 | Kawamura et al. | ........... 386/225 |
| 7,034,880 B1 | * | 4/2006 | Endsley et al. | .......... 348/333.11 |
| 7,158,175 B2 | * | 1/2007 | Belz et al. | ................... 348/231.3 |
| 7,327,387 B2 | * | 2/2008 | Tanaka et al. | ............ 348/207.99 |
| 7,515,175 B2 | * | 4/2009 | Tanaka et al. | ............ 348/207.99 |
| 7,522,197 B2 | * | 4/2009 | Takahashi | ................ 348/231.99 |
| 7,702,821 B2 | * | 4/2010 | Feinberg et al. | ................ 710/13 |
| 7,755,661 B2 | * | 7/2010 | Aizawa | ...................... 348/207.1 |
| 8,046,504 B2 | * | 10/2011 | Feinberg et al. | ................ 710/33 |
| 2004/0263644 A1 | * | 12/2004 | Ebi | ............................ 348/231.2 |
| 2005/0246496 A1 | * | 11/2005 | Nagata | .......................... 711/117 |
| 2008/0297366 A1 | * | 12/2008 | Hsieh et al. | ................. 340/686.1 |
| 2008/0300785 A1 | * | 12/2008 | Hsieh et al. | .................... 701/300 |
| 2010/0026816 A1 | * | 2/2010 | Bergstrom et al. | ...... 348/207.11 |
| 2010/0029326 A1 | * | 2/2010 | Bergstrom et al. | ........ 455/556.1 |

FOREIGN PATENT DOCUMENTS

JP  2004-341586  12/2004

* cited by examiner

Primary Examiner — Justin P Misleh

(74) Attorney, Agent, or Firm — Cowan, Liebowitz & Latman, P.C.

(57) ABSTRACT

When storing an image file in an external recording medium with a communication function that is configured to automatically transfer a JPEG file stored in a predetermined directory, the apparatus stores a thumbnail image obtained by reducing an image size of a primary image in a predetermined directory. The primary image file is stored in a different directory to the predetermined directory.

7 Claims, 3 Drawing Sheets

FILE MANAGEMENT APPARATUS AND CONTROL METHOD THEREOF

BACKGROUND OF THE INVENTION

1. Field of the Invention

The present invention relates to a communication-controlling apparatus and a control method thereof, and an image-capturing apparatus. More particularly, the invention relates to a communication-controlling apparatus that transfer image data and a control method thereof, and an image-capturing apparatus.

2. Description of the Related Art

Conventionally, in digital cameras, DCF (Design rule for Camera File system) is generally adopted as a file system for use when recording image data acquired by photographing. According to DCF, it is possible to embed data of a thumbnail image that is a reduced image corresponding to the image in question in a file (hereunder, referred to as "JPEG file") that stores JPEG data obtained by applying compression encoding according to the JPEG standard to image data acquired by photographing.

Development is also proceeding with respect to digital cameras with a wireless communication function that can transmit image data obtained by photographing directly to a server or the like from the digital camera by wireless communication. By using such kind of digital camera with a wireless communication function, a user can efficiently utilize the recording capacity of a recording medium attached to the digital camera. However, when transmitting image data by wireless communication using a digital camera with a wireless communication function, if the data size of image data is oversized with respect to the communication speed, a long time is required to complete the communication.

In this regard, Japanese Patent Laid-Open No. 2004-341586 discloses technology that records both image data of a normal size that is acquired by photographing a subject and image data of a smaller size that is generated based on the image data in question on a recording medium, and transmits only the small-size image data to a server. By using the technology disclosed in Japanese Patent Laid-Open No. 2004-341586, a communication time required for transmitting image data can be shortened.

Amidst these demands with respect to image transmission, a memory card with a communication function for specialized use with digital cameras has been developed. The memory card is called an "Eye-Fi card" (registered trademark). This memory card with a communication function integrates a communication function by use of a wireless LAN into a memory card that has a non-volatile semiconductor memory. When this memory card is attached as the recording medium of a digital camera, it is possible to automatically transmit recorded image data to a predetermined destination.

However, since a feature of this memory card with a communication function is that the card transmits all JPEG files that exist inside a folder conforming to DCF, there is the following problem. That is, according to this memory card with a communication function, image data is transmitted irrespective of the data size of the image data to be transmitted. Consequently, even image files that have a large data size are objects of transmission, and in some cases a great deal of time is required to complete transmission.

SUMMARY OF THE INVENTION

In view of the aforementioned problem, an object of the present invention is to provide a communication-controlling apparatus and a control method thereof capable of curbing the time required for transferring data by an external recording medium with a communication function that is configured to transfer an image file stored in a predetermined directory, and an image-capturing apparatus.

According to an aspect of the present invention, there is provided a communication-controlling apparatus that transfers an image file, in which image data is stored, to an external device by wireless communication using an external recording medium with a communication function, wherein the external recording medium comprises a storage unit and a communication unit that transfers a file stored in a predetermined directory formed in the storage unit to an external device by the wireless communication, and the communication unit of the external recording medium can be inactivated and activated from a device to which the external recording medium is attached, the communication-controlling apparatus comprising: a generation unit that reduces an image size of first image data to generate second image data; a connection unit to which the external recording medium is to be attached; an access control unit that controls read and/or write of a file from/to the storage unit of the external recording medium that is attached to the connection unit; and a control unit that controls of the access control unit and the communication unit comprised by the external recording medium; wherein the control unit controls the access control unit so as to store a first image file in which the first image data is stored in a directory that is different from the predetermined directory of the storage unit, and store a second image file in which the second image data in the predetermined directory of the storage unit.

According to another aspect of the present invention, there is provided a control method of a communication-controlling apparatus that transfers an image file, in which image data is stored, to an external device by wireless communication using an external recording medium with a communication function, wherein the external recording medium comprises a storage unit and a communication unit that transfers a file stored in a predetermined directory formed in the storage unit to an external device by the wireless communication, and the communication unit of the external recording medium can be inactivated and activated from a device to which the external recording medium is attached, comprising: a generation step in which a generation unit reduces an image size of first image data to generate second image data; an access control step in which an access control unit controls read and/or write of a file from/to the storage unit of the external recording medium that is attached to a connection unit of the communication-controlling apparatus; and a control step of controlling the access control step and the communication unit comprised by the external recording medium; wherein in the control step, the access control step is controlled so as to store a first image file in which the first image data is stored in a directory that is different from the predetermined directory of the storage unit, and store a second image file in which is stored the second image data in the predetermined directory of the storage unit.

According to further aspect of the present invention, there is provided an image-capturing apparatus, comprising: an image capturing unit that captures an image of light incident via an image-capturing optical system, and outputs the captured image as image-capturing signals; a signal processing unit that executes predetermined signal processing with respect to the image-capturing signals, and outputs the processed image-capturing signals as the first image data; and a communication-controlling apparatus according to the present invention.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
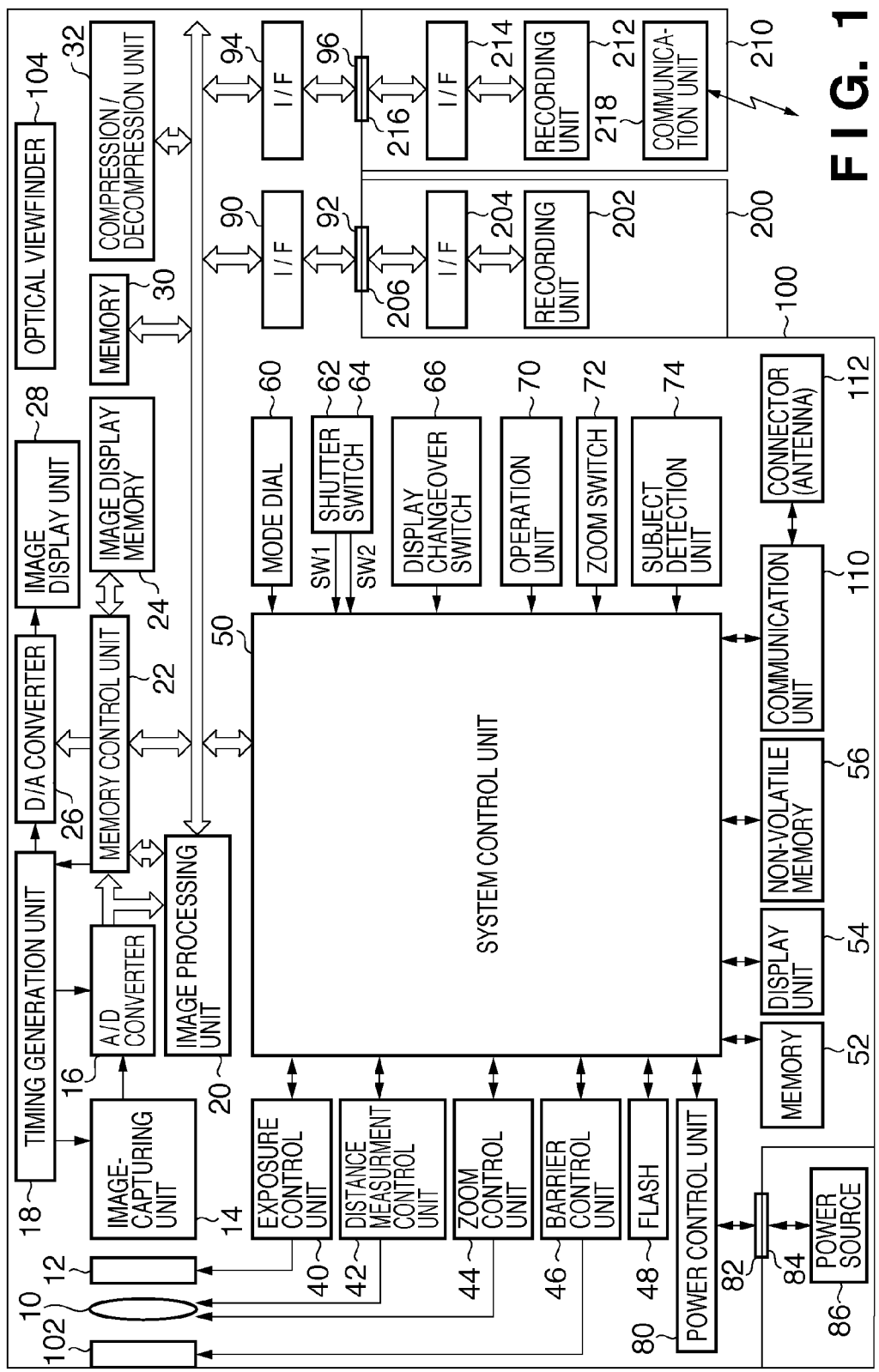
FIG. 1 is a block diagram illustrating an example of the configuration of a digital camera as an example of a communication-controlling apparatus according to an embodiment of the present invention.

FIG. 1 is a view that shows an example of the configuration of a digital camera 100 as an example of a communication-controlling apparatus according to an embodiment of the present invention. An image-capturing optical system includes a photographing lens 10 and a shutter 12 having a diaphragm mechanism. Light from a subject is passed through an image-capturing optical system and is incident on an image-capturing unit 14 that has an image sensor comprising a CCD or CMOS sensor that converts an optical image into electrical signals. An A/D converter 16 converts image-capturing signals formed by analog signals outputted from the image-capturing unit 14 into digital signals, and outputs the digital signals as image data. A memory control unit 22 and a system control unit 50 control a timing generation unit 18. The timing generation unit 18 supplies a clock signal or a control signal to the image-capturing unit 14, the A/D converter 16, and a D/A converter 26.

An image processing unit 20 performs signal processing including predetermined pixel interpolation processing and color conversion processing on image data supplied from the A/D converter 16 or the memory control unit 22. The image processing unit 20 also performs predetermined arithmetic processing using image data supplied from the A/D converter 16. The computed results are supplied to the system control unit 50 via the memory control unit 22. Based on the computed results, the system control unit 50 performs control with respect to an exposure control unit 40, a distance measurement control unit 42, and a flash 48. As a result, through-the-lens (TTL) auto focus (AF) processing, auto exposure (AE) processing, and flash pre-emission (EF) processing are performed. Further, the image processing unit 20 performs predetermined arithmetic processing using captured image data supplied from the A/D converter 16, and performs TTL auto white balance (AWB) processing based on the computed results.

The memory control unit 22 controls the A/D converter 16, the timing generation unit 18, the image processing unit 20, an image display memory 24, the D/A converter 26, a memory 30, and a compression/decompression unit 32. Image data outputted from the A/D converter 16 is supplied to the memory control unit 22 directly or via the image display memory 24. The image data is written into the image display memory 24 or the memory 30 by the memory control unit 22.

An image display unit 28 displays supplied image data on a display device constituted by an LCD or an organic EL display or the like. Image data for display that has been written into the image display memory 24 is displayed by the image display unit 28 via the D/A converter 26. An electronic viewfinder function can be realized by sequentially displaying image data captured with the image-capturing unit 14 on the image display unit 28. Further, the image display unit 28 can arbitrarily be turned on or off in accordance with an instruction from the system control unit 50. If the display is turned off, the power consumption of the digital camera 100 can be greatly reduced.

The memory 30 stores data of still images and moving images that have been captured, and has sufficient storage capacity for storing data of a predetermined number of still images and a predetermined time period of moving images. Consequently, it is possible to write a large amount of data into the memory 30 at high speed, even when performing panoramic photography or continuous-exposure photography in which a plurality of still images are photography in succession. Further, the memory 30 can be used as a work area of the system control unit 50.

The compression/decompression unit 32 that reads image data stored in the memory 30, performs known data compression processing or decompression processing using adaptive discrete cosine transformation (ADCT), wavelet transformation or the like, and writes the processed data into the memory 30.

The exposure control unit 40 controls the shutter 12 that has a diaphragm function for controlling the light exposure to an image sensor of the image-capturing unit 14. The system control unit 50 realizes a flash light control function by means of the flash 48 based on a photometric result of the exposure control unit 40.

The distance measurement control unit 42 controls focusing of the photographing lens 10. A zoom control unit 44 controls zooming of the photographing lens 10. A barrier control unit 46 controls operation of a protection unit 102 that is a barrier that covers the photographing lens 10 of the digital camera 100 to prevent the photographing lens 10 from becoming dirty or damaged. The flash 48 functions as an auxiliary light source when photographing, and includes a light control function. The flash 48 also has an AF auxiliary light projection function. The exposure control unit 40 and the distance measurement control unit 42 are controlled using the TTL method. The system control unit 50 carries out control with respect to the exposure control unit 40 and the distance measurement control unit 42 based on results of computations performed for captured image data by the image processing unit 20.

The system control unit 50 that serves as a control unit and an access control unit comprises, for example, a microprocessor. A memory 52 is, for example, a ROM, and previously stores constants, variables, and programs and the like for operation of the system control unit 50. The system control unit 50 controls overall operation of the digital camera 100 in accordance with programs and the like stored in the memory 52.

A file system for managing read and/or write of data with respect to an external recording medium connected to a connector 92 or a connector 96, described later, is implemented by a program executed by the system control unit 50. By means of the file system, the system control unit 50 creates a directory in an external recording medium connected to the connector 92 or connector 96, controls the storage of files in the directory, and manages the directory structure or files stored in the directory and the like.

A display unit 54 notifies a user of the operating status or messages or the like using text, images, sound and the like in correspondence with execution of a program by the system control unit 50. One or a plurality of the display units 54 are provided, for example, at a position that is easily recognized visually in the vicinity of the operation unit 70 of the digital camera 100. The display unit 54 is constructed with a combination of, for example, a display device such as an LCD or LED and a sound generating device and so forth. A part of the functions of the display unit 54 are provided within an optical viewfinder 104.

The display contents of the display unit 54 displayed on the LCD or the like include a single-exposure/continuous-exposure indication, a self timer indication, a compression rate indication, indication of the number of recording pixels, indication of the number of recorded images, indication of the remaining number of images that can be photographed, and a shutter speed indication. Further, an f-stop value indication, an exposure compensation indication, a flash indication, red-eye mitigation indication, a macro photographing indication, a buzzer setting indication, a timer battery level indication, a battery level indication, an error indication, and an information indication formed by a plurality of digits and the like are also displayed on the LCD. The information displayed on the LCD also includes information of an external storage medium 93 and the attached/detached status of the external storage medium 93, as well as the date and time.

The display contents of the display unit 54 that are displayed within the optical viewfinder 104 include a focus state indication, a camera shake warning indication, a flash charge indication, a shutter speed indication, an f-stop value indication, and an exposure compensation indication.

For example, an electrically erasable and recordable memory such as an EEPROM is used as a non-volatile memory 56. The non-volatile memory 56 stores, for example, various kinds of setting information for the digital camera 100.

A mode dial switch 60 is used to switch between various function modes of the digital camera 100, such as the power off state, an auto photographing mode, still image photographing mode, a panoramic photographing mode, a playback mode, a multi-screen playback/erase mode, and a PC connection mode.

A shutter switch 62 (denoted by SW1 in the drawing) is used to perform a photographing standby operation such as AF processing or AE processing. A shutter switch 64 is a photographing switch (denoted by SW2 in the drawing) for actually performing photographing after operation of the shutter switch 62. That is, the shutter switch 62 operates in a state in which a shutter button is in a half-pressed state, and the shutter switch 64 operates in a state in which the shutter button is in a fully pressed state.

A display changeover switch 66 is used to instruct changeover of the display of the image display unit 28. By operating the display changeover switch 66, it is possible to conserve power when performing photographing using the optical viewfinder 104, by blocking the power supply to the image display unit 28 comprising an LCD or the like.

An operation unit 70 includes operation members such as a variety of buttons and a touch panel, and accepts user operations. Examples of the operation members provided in the operation unit 70 include a menu button, a setting button, a macro button, a multi-screen playback page change button, a flash settings button, and a single-exposure/continuous-exposure/self-timer switching button. The operation unit 70 is also provided with a menu moving plus (+) button, a menu moving minus (−) button, a playback image moving plus (+) button, a playback image moving minus (−) button, a photographing image quality selection button, an exposure compensation button, a date/time setting button, an image deletion button, and an image deletion cancel button.

These operation members provided in the operation unit 70 may be provided as respectively independent switches or the like, or may be configured as areas on a touch panel. The operation unit 70 may include arrow keys (direction keys) used to respectively designate movement in the upper, downward, left, and right directions, and an enter key. The functions of the respective operation members may also be implemented by a combining the aforementioned keys with a cursor displayed on a setting screen displayed on the image display unit 28.

A zoom switch 72 accepts user instructions to change the magnification of a photographed image. The zoom switch 72 includes a tele switch that changes the image-capturing angle of view to a telescopic side, and a wide switch that changes the image-capturing angle of view to a wide-angle side. By operating the zoom switch 72, the user instructs the zoom control unit 44 to change the image-capturing angle of view of the photographing lens 10. Thus, operation of the zoom switch 72 serves as the trigger to perform an optical zoom operation. Further, operation of the zoom switch 72 also serves as a trigger for an operation to cut out an image by the image processing unit 20 and to electronically change an image-capturing angle of view by means of pixel interpolation processing or the like.

A subject detection unit 74 includes an element that detects a subject or the like. A case may also be considered in which a face is detected as the subject.

A power control unit 80 includes a battery detection circuit, a DC-DC converter, a switching circuit that switches a block to be energized, and the like. The power control unit 80 detects whether or not a battery as a power source 86 is mounted, the battery type, and the remaining capacity of the battery. The power control unit 80 controls the DC-DC converter based on the detected results and instructions of the system control unit 50, and supplies a required voltage to each component including a recording medium for a required time period.

The power source 86 comprises a primary battery such as an alkaline battery or a lithium battery, a secondary battery such as an NiCd battery, an NiMH battery or an Li battery, an AC adapter, or the like. The power source 86 is connected to the power control unit 80 via a connector 82 and a connector 84.

By utilizing the optical viewfinder 104 it is possible to perform photographing without using an electronic viewfinder function of the image display unit 28. Further, some of the functions of the display unit 54 are provided inside the optical viewfinder 104. These functions include, for example, a focus state indication, a camera shake warning indication, a flash charge state indication, a shutter speed indication, an f-stop value indication, and an exposure compensation indication.

A communication unit 110 controls data communication between the digital camera 100 and an external device. For example, image data that is read from the external storage medium 93 by the system control unit 50 is transmitted to an external device using a connector (antenna) 112, described later, by the communication unit 110.

A communication system that can be applied to the communication unit 110 is not particularly limited, and may be any system that enables two-way data communication between the communication unit 110 and an external device. For example, a USB or IEEE 1394 system can be applied to the communication unit 110. Wireless communication can also be applied to the communication unit 110. The communication systems are not limited thereto, and RS232C, P1284, SCSI, a modem, a LAN or the like may also be applied to the communication unit 110.

The connector (antenna) 112 makes an electrical connection with an external device when the communication unit 110 performs data communication with an external device. When a communication system that performs wired communication, such as USB or IEEE 1394, is being applied to the communication unit 110, the structure of the connector (antenna) 112 is provided with a terminal for performing physical contact. More specifically, in this case, the communication unit 110 and an external device are electrically connected by physically contacting a terminal provided in a USB or IEEE 1394 cable with a terminal provided in the connector (antenna) 112. Further, when a communication system that performs data communication by wireless communication is being applied to the communication unit 110, the connector (antenna) 112 is configured as an antenna for transmitting and receiving radio waves.

An I/F (interface) 90 is an interface with an external recording medium. Based on control of the I/F 90 corresponding to instructions of the system control unit 50, recording and playback of data is performed with respect to an external recording medium that is connected by physical contact to the connector 92. Similarly, an I/F 94 is an interface with an external recording medium. Based on control of the I/F 94 corresponding to instructions of the system control unit 50, recording and playback of data is performed with respect to an external recording medium that is connected by physical contact to the connector 96.

More specifically, image data obtained by capturing an image with the image-capturing unit 14 is compressed with the compression/decompression unit 32 to make compressed image data. Based on control of the system control unit 50, the compressed image data is, for example, supplied to the external recording medium via the I/F 90 and connector 92, and stored therein as a file.

Members conforming to SD card standards can be respectively used as the I/F 90 and connector 92 as well as the I/F 94 and connector 96 that are connection units. The invention is not limited thereto, and members conforming to standards such as those of a PCMCIA card or a CF (compact flash (registered trademark) card) or the like can also be used as the I/F 90 and connector 92 as well as the I/F 94 and connector 96. More specifically, various kinds of communication cards such as a LAN card, a modem card, a USB card, an IEEE 1394 card, an SCSI card, and a PHS card can be connected. Thus, image data and management information attached to the image data can be exchanged with other computers and peripheral devices such as a printer.

According to the present description, the digital camera 100 has two systems comprised of interfaces for attaching an external recording medium and connectors. Naturally, the invention is not limited to such an arrangement, and the digital camera 100 may be configured to have only one system or three or more systems comprised of interfaces for attaching an external recording medium and connectors. Further, when the digital camera 100 has a plurality of systems comprised of interfaces and connectors, the digital camera 100 may be configured with a combination of interfaces and connectors complying with different standards.

An external recording medium 200 includes a recording unit 202 that records data, an I/F 204 that performs a connection between the recording unit 202 and an external device or the like, and a connector 206 that connects with the above described connector 92 by physical contact. Similarly, an external recording medium 210 includes a recording unit 212 as a storage unit that records data, an I/F 214 that performs a connection with an external device or the like, and a connector 216 that connects with the above described connector 96 by physical contact. For example, a non-volatile semiconductor memory can be applied as the recording units 202 and 212. The invention is not limited thereto, and a hard disk may also be used as the recording unit 202 or the recording unit 212.

In the example shown in FIG. 1, the external recording medium 210 further includes a communication unit 218 that has a communication function that uses a wireless LAN. Hereunder, the external recording medium 210 having the communication unit 218 as a communication unit is referred to as "external recording medium with a communication function 210". For example, upon detecting a signal from an access point of a wireless LAN, the communication unit 218 performs communication with the access point using a predetermined protocol to establish communication by means of the wireless LAN. When communication by the wireless LAN is established, the communication unit 218 scans a predetermined directory created in the recording unit 212 to detect predetermined kinds of files based on the file names, and transfers all of the detected files to an external device via the wireless LAN. The predetermined directory is, for example, a DCIM directory according to the DCF standard.

Further, the communication unit 218 is configured to enable control of transfer of data recorded in the recording unit 212 by wireless LAN based on a transfer-inactivating command and a transfer-activating command supplied from the system control unit 50 via the I/F 94 and the like. For example, in accordance with a transfer-inactivating command supplied form the system control unit 50, the communication unit 218 can inactivate file transfer after establishing communication by wireless LAN as described above. Further, in accordance with a transfer-activating command supplied form the system control unit 50, the communication unit 218 lifts the inactivation of file transfer by the transfer-inactivating command, to thereby enter a state in which file transfer is possible.

In response to a predetermined command supplied form the system control unit 50 via the I/F 94 or the like, the communication unit 218 can return status information showing the data transfer state by wireless LAN to the system control unit 50. Based on the status information, the system control unit 50 can know whether or not file transfer has been completed.

<File Management Method>

Figure 2:
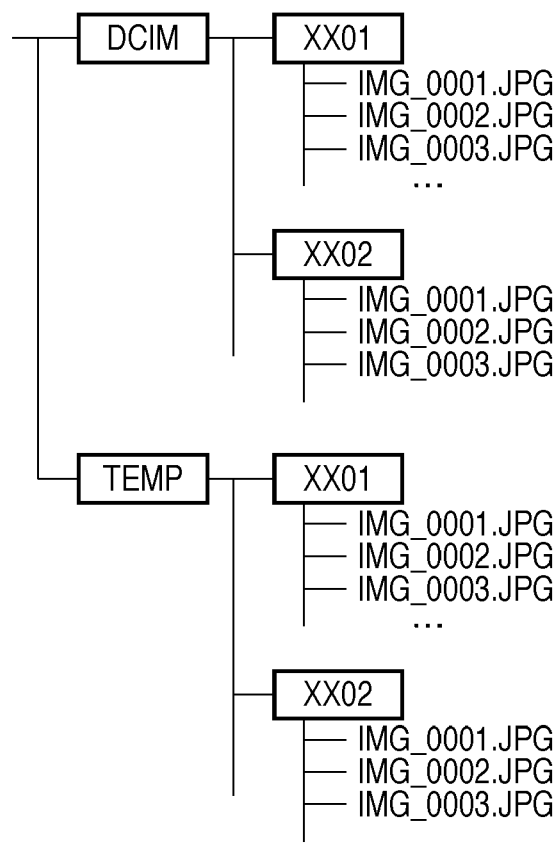
FIG. 2 is a view that illustrates an example of the management structure of data stored in an external recording medium with a communication function according to an embodiment of the present invention.

Next, a method of managing files that can be applied to the present embodiment is described. FIG. 2 shows an example of the management structure of data that is stored in the external recording medium with a communication function 210. The digital camera 100 according to the present embodiment manages data that is stored in the external recording medium with a communication function 210 by a file system using a hierarchical structure as exemplified in FIG. 2.

More specifically, in the external recording medium with a communication function 210, data is stored in files, and the files are organized in directory. The directory can be further organized into separate directories. The hierarchical structure is defined by the directories. The uppermost directory in the hierarchical structure is referred to as a "root directory". All of the files can be accessed by tracing the files from the root directory to subordinate directories in a sequential manner.

In the example shown in FIG. 2, in the external recording medium with a communication function 210, a DCIM directory as defined by the DCF standard and a TEMP directory that does not conform to the DCF standard are provided directly below the uppermost root directory. According to DCF, an image file obtained by photographing is stored in a directory created below the DCIM directory or is stored directly below the DCIM directory. In this connection, a name of a directory that does not conform to the DCF standard is not limited to "TEMP", and another name can also be used.

That is, according to the example shown in FIG. 2, a directory XX01 and a directory XX02 are created directly below the directory DCIM, and JPEG files are stored directly below the directory XX01 and directory XX02, respectively. In the example shown in FIG. 2, the files IMG_0001.JPG, IMG_0002.JPG . . . are stored directly below the directory XX01. Further, the files IMG_0001.JPG, IMG_0002.JPG . . . are stored directly below the directory XX02. Since each file is identified by a path that includes the directory name and file name, different files that have the same file name can be stored in different directories.

Hereunder, in the interest of brevity, for example, "files stored in directory XX01 that is directly below the DCIM directory" is described as "files stored in the DCIM directory".

In the file name, the three characters after the ". (period)" are an extension that represent the kind of data stored in the file. In the example shown in FIG. 2, an extension "JPG" indicates that image data for which compression encoding has been applied according to the JPEG method is stored in the relevant file.

At the external recording medium with a communication function 210, when performing data transfer by wireless communication, the communication unit 218 transfers all image files of a predetermined format that exist under the DCIM directory defined by the DCF standard. In contrast, when performing data transfer by wireless communication, the communication unit 218 ignores the TEMP directory that does not conform to the DCF standard and the files stored in the TEMP directory.

As described in detail later, the digital camera 100 according to the present embodiment temporarily stores a file of original image data obtained by photographing in a TEMP directory. Together therewith, the digital camera 100 generates an image data file of a predetermined image size from the image data in question, and stores the file in the DCIM directory. When transfer of the image file stored in the DCIM directory to an external device or the like by the communication unit 218 is completed, the image file stored in the TEMP directory and the image file stored in the DCIM directory are organized to generate a single complex image file.

In this connection, it is assumed that, for example, the DCIM directory and the TEMP directory are automatically generated by the system control unit 50 when the external recording medium with a communication function 210 is first attached to the digital camera 100.

<File Structure>

Figure 3:
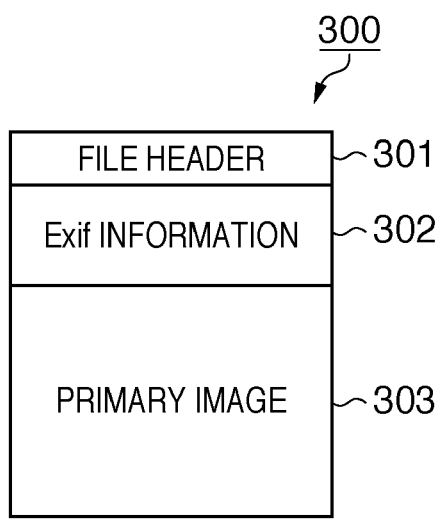
FIG. 3 is a view that illustrates an example of the structure of a JPEG file that is applicable to an embodiment of the present invention.

Next, a file structure that is applicable to the present embodiment is described. FIG. 3 illustrates an example of the structure of a JPEG file 300 that is applicable to the present embodiment. Exif information is added to the JPEG file 300 exemplified in FIG. 3. The Exif information can include information showing photographing conditions at the time the relevant JPEG file 300 was generated, and information relating to image data stored in the relevant JPEG file 300. The Exif information can also include a thumbnail image based on the primary JPEG data stored in the relevant JPEG file.

A file header 301 that stores information indicating the start of the file is located at the beginning of the JPEG file 300. A region 302 that stores Exif information is located after the file header 301. A region 303 that stores the original JPEG data (referred to as "primary JPEG data") stored in this JPEG file is located after the region 302.

Figure 4:
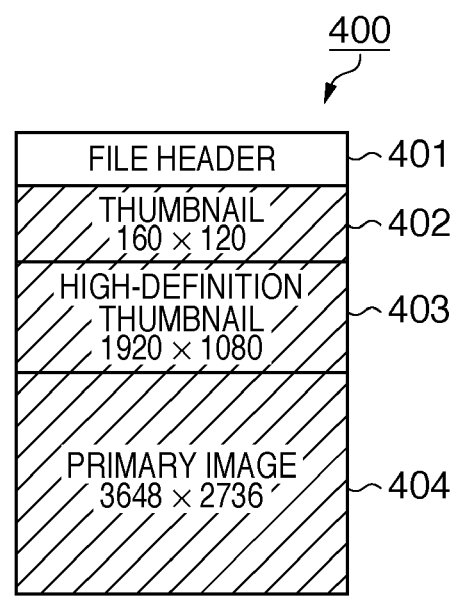
FIG. 4 is a view that illustrates an example of the structure of a complex image file that is applicable to an embodiment of the present invention.

FIG. 4 shows an example of the structure of a complex image file 400 that is applicable to the present embodiment. According to the present embodiment, a file structure proposed as MPF (Multi Picture Format) is adopted as the structure of the complex image file. Hereunder, a file having the file structure proposed for MPF is referred to as an "MP file".

MPF (Multi Picture Format) will now be described in brief. MPF defines file information for enabling data of a plurality of still images to be stored in the same file. According to MPF, data of a thumbnail image with respect to the primary image data can be embedded in an MP file. The thumbnail image is suitable for viewing with a high-definition television set, and is referred to as a "high-definition thumbnail". For example, if the primary image data is JPEG data with an aspect ratio of 16:9, data of a high-definition thumbnail image with a size of 1920×1080 pixels can be embedded.

More specifically, according to DCF, the size of a thumbnail image that can be embedded in a JPEG file is defined as QQVGA size, i.e. 160×120 pixels. Therefore, when such a thumbnail image is displayed on a high-definition television set whose display resolution is, for example, 1920×1080 pixels, there is a concern that the display of the thumbnail image will appear grainy. On the other hand, the numbers of pixels of images captured with digital cameras and the like are increasing to, for example, 3648×2736 pixels accompanying increases in the number of pixels of image sensors, and high-definition television sets and the like that do not have decoding hardware require a long time to play back such images.

Therefore, these respective requirements can be satisfied by recording a QQVGA size thumbnail image, a high-definition thumbnail image, and the original-size image (referred to as "primary image") in the same file using MPF as described above.

Returning to the description of FIG. 4, a file header 401 that stores information indicating the start of the file is located at the beginning of the complex image file 400 according to the present embodiment. A region 402 that stores Exif information corresponding to the primary image is located after the file header 401. The region 402 can store a QQVGA size thumbnail image as described above. A region 403 that stores attached information according to MPF is located after the region 402. The region 403 can store a high-definition thumbnail image as described above. The primary image is stored in a region 405 located after the region 404.

In the present example, it is assumed that the image size of the primary image is 3648×2736 pixels, and the size of a high-definition thumbnail image corresponding thereto is 1920×1080 pixels. For example, a high-definition thumbnail image of 1920×1080 pixels is generated by trimming the top and bottom of the primary image to achieve an aspect ratio of 16:9 and thereafter performing thinning and interpolation processing.

According to MPF, individual images are constructed with the regions 401 to 404, respectively. Thus, a plurality of individual images can be stored in a single MP file. An individual image that is stored at the start of the MP file is referred to as a "first image". Hereunder, for description purposes, it is assumed that one MP file includes only a first image. In this case, the extension "JPG" that is the same as the extension of a JPEG file can be sued as the extension of the MP file.

<Image Data Transfer Processing>

Figure 5:
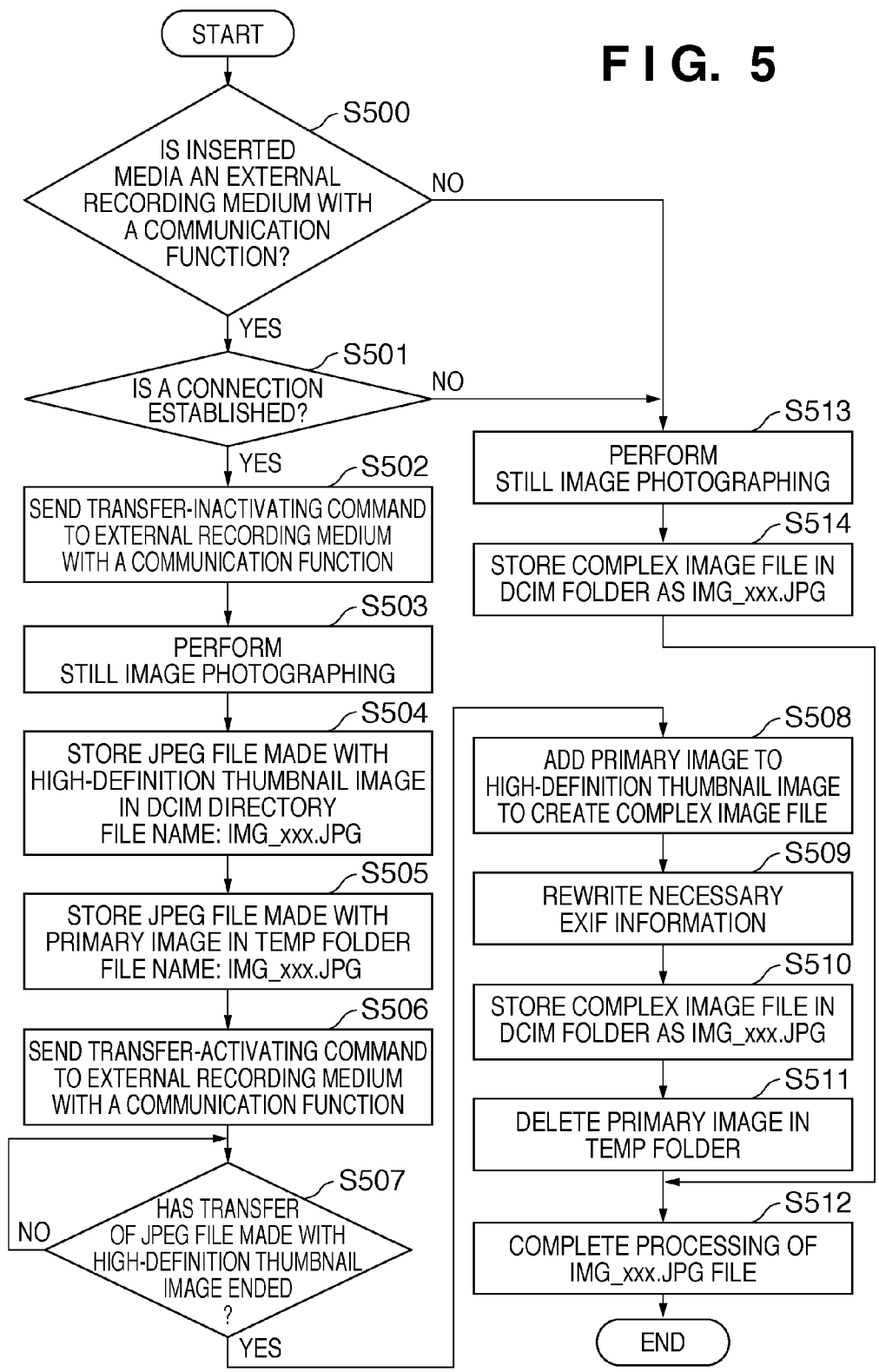
FIG. 5 is a flowchart that illustrates an example of processing to transfer image data according to an embodiment of the present invention.

FIG. 5 is a flowchart that illustrates an example of processing for transferring image data according to the present embodiment. Each process in the flowchart shown in FIG. 5 is executed by the system control unit 50 in accordance with a program. When a still image photography mode is activated in the digital camera 100, in S500 the system control unit 50, for example, determines whether or not an external recording medium that is connected to the connector 92 or 96 is the external recording medium with a communication function 210. In this case, it is assumed that the connector 96 supports the external recording medium with a communication function 210.

For example, the system control unit 50 reads out from the external recording medium a model name that has been previously stored as attribute information in the external recording medium connected to the connector 96, and determines whether or not the external recording medium in question is the external recording medium with a communication function 210 based on the model name.

If the system control unit 50 determines that the external recording medium connected to the connector 96 is not the external recording medium with a communication function 210, the processing moves to S513 in which a normal still image photographing operation is performed. In the subsequent S514, the system control unit 50 generates the aforementioned complex image file 400 based on the image data obtained in S513, and stores the complex image file 400 with a predetermined file name below the DCIM directory in the recording unit 212 of the external recording medium with a communication function 210. When recording of the complex image file 400 to the external recording medium is completed, the series of processes produced by a single still image photographing operation ends.

An example of the processing performed in S513 and S514 is described in detail hereafter. In S513, the system control unit 50 stands by for the shutter switch 64 to be pressed. When the shutter switch 64 is pressed, the shutter 12 opens under control by the system control unit 50, light from a subject is incident on the image-capturing unit 14, and analog image-capturing signals corresponding to the incident light are output from the image-capturing unit 14. The analog image-capturing signals are converted to digital signals at the A/D converter 16, and supplied to the image processing unit 20 as image data. Image data that has undergone predetermined image processing at the image processing unit 20 is temporarily stored in the memory 30 via the memory control unit 22.

In this case, image data that is output from the image processing unit 20 and stored in the memory 30 has, for example, an image size (hereunder, referred to as "original size") of 3648×2736 pixels.

The original size image data is read out from the memory 30 by control of the system control unit 50 and supplied to the compression/decompression unit 32. For example, compression encoding according to the JPEG system is applied to the original size image data supplied thereto, and the data is again stored in the memory 30 as compressed image data. The compressed image data that is obtained by applying compression encoding to the original size image data is referred to hereunder as "primary image data".

Further, the system control unit 50 executes pixel thinning or interpolation processing with respect to the original size image data stored in the memory 30 to thereby generate reduced image data for which the image size has been reduced with respect to the original size. In this case, it is assumed that first reduced image data of 1920×1080 pixels and second reduced image data of 160×120 pixels are generated. The second reduced image data can be omitted according to the present embodiment. The system control unit 50 supplies the generated first and second reduced image data to the compression/decompression unit 32. The compression/decompression unit 32 applies compression encoding to the first and second reduced image data, respectively, according to, for example, the JPEG system, and stores the compressed reduced image data in the memory 30 again.

In this connection, information such as the photographing conditions is, for example, acquired as prescribed by the system control unit 50 from the exposure control unit 40, the distance measurement control unit 42, and the zoom control unit 44 and the like.

Subsequently, in S514, the system control unit 50 creates the complex image file 400 described by way of FIG. 4 above using the primary image data and the first and second reduced image data to which compression encoding has been applied and which are stored in the memory 30. The system control unit 50 assigns a predetermined file name to the created complex image file 400, and stores the file under the DCIM directory of the recording unit 212 of the external recording medium 210 that is connected to the connector 96.

The file name of the complex image file 400 at this time is, for example, "IMG_xxxx.JPG". Since the complex image file 400 generated in this case includes only a first image, the complex image file 400 can be handled as a JPEG file. Accordingly, the extension "JPG" that is the same as that of a JPEG file can be used as the extension of the file name of the complex image file 400 including only the first image. The characters "xxxx" in the relevant file name are assumed to be serial numbers that show the storing order of files in the DCIM directory.

For example, the system control unit 50 forms the file header 401 that includes predetermined information, and stores Exif information, i.e. information indicating photographing conditions and the like, and the second reduced image data to which compression encoding has been applied in the region 402 that is the next region after the file header 401. The system control unit 50 stores the first reduced image data to which compression encoding has been applied in the region 403 that the next region after the region 402. Further, the system control unit 50 stores the primary image data in the region 404 that follows the region 403, to thereby create the complex image file 400. The system control unit 50 writes the complex image file 400 under the DCIM directory of the recording unit 212 of the external recording medium 210 connected to the connector 96.

In the aforementioned S500, if the system control unit 50 determines that the external recording medium connected to the connector 96 is the external recording medium with a communication function 210, the processing moves to S501. In S501, the system control unit 50 determines whether or not wireless communication is established between the external recording medium with a communication function 210 and an external device. For example, the system control unit 50 transmits a command requesting a communication status to the external recording medium with a communication function 210 via the I/F 94 and the connector 96. Based on communication status information returned from the external recording medium with a communication function 210 in response to the aforementioned command, the system control unit 50 determines whether or not wireless communication has been established.

If the system control unit 50 determines in S501 that communication has not been established, the processing moves to S513 in which normal still image photographing operations are performed as described above.

In contrast, if the system control unit 50 determines in S501 that wireless communication has been established between the external recording medium with a communication function 210 and an external device, the processing moves to S502. In S502, the system control unit 50 sends a transfer-inactivating command to the external recording medium with a communication function 210 to instruct the external recording medium with a communication function 210 to inactivate of data transfer by wireless communication. The processing then moves to S503.

In S503, the system control unit 50 stands by for the user to press the shutter switch 64. When the shutter switch 64 is pressed the system control unit 50 executes an operation to photograph a still image.

More specifically, in the same manner as the operation in the aforementioned S513, the system control unit 50 generates original size image data based on image-capturing signals that correspond to light from a subject that is incident on the image-capturing unit 14, and stores the original size image data in the memory 30. The compression/decompression unit 32 applies compression encoding to the original size image data that has been stored in the memory 30, and thereafter the compressed image data is written into the memory 30 once more. Further, the system control unit 50 generates first reduced image data (high-definition thumbnail image data) of 1920×1080 pixels and second reduced image data of 160×120 pixels based on the original size image data stored in the memory 30. The first and second reduced image data, respectively, are applied with compression encoding by the compression/decompression unit 32, and the compressed image data is stored into the memory 30 once more.

The processing moves to the subsequent S504 to create the JPEG file 300 that was described above utilizing FIG. 3. The JPEG file 300 is created using the first and second reduced image data which underwent compression encoding and were stored in the memory 30 by the system control unit 50 in S503. The system control unit 50 assigns a predetermined file name to the created JPEG file 300, and stores the file under the DCIM directory formed in the recording unit 212 of the external recording medium 210 connected to the connector 96. The file name of the JPEG file 300 at this time is, for example, "IMG xxxx.JPG".

For example, the system control unit 50 forms the file header 301 that includes predetermined information, and stores Exif information in the region 302 that follows the file header 301. More specifically, the system control unit 50 stores information showing the photographing conditions and the like, and the second reduced image data to which compression encoding has been applied in the region 302. Next, the system control unit 50 stores the first reduced image data to which compression encoding has been applied in the region 303 that follows the region 302, to thereby create the JPEG file 300. The system control unit 50 writes the JPEG file 300 with a predetermined file name under the DCIM directory in the recording unit 212 of the external recording medium with a communication function 210 connected to the connector 96.

Next, in S505, the system control unit 50 stores in a file the primary image data to which compression encoding has been applied and which has been stored in the memory 30, to thereby create a JPEG file made with primary image data. The system control unit 50 assigns a predetermined file name to the JPEG file made with primary image data, and stores the file under a TEMP directory created in the recording unit 212 of the external recording medium with a communication function 210 that is connected to the connector 96.

Here, it is assumed that, for example, the same file name as that of the JPEG file 300 in which the first and second reduced image data that have been generated from the same original size image data are stored is used as the file name of the JPEG file made with primary image data at this time. More specifically, if the file name of the JPEG file 300 is "IMG__0001.JPG", the file name of the JPEG file made with primary image data is also "IMG__0001.JPG".

The file name of the JPEG data made with primary image data is not limited to this example, and may be another file name as long as the JPEG data made with primary image data is associated with the JPEG file 300 in which the first and second reduced image data that have been generated from the same original size image data are stored.

When storage of the image data in the external recording medium with a communication function 210 according to S504 and S505 is completed, the system control unit 50 moves the processing to S506. In S506, the system control unit 50 sends a transfer-activating command that instructs the activation of data transfer by wireless communication to the external recording medium with a communication function 210.

Upon receiving the transfer-activating command, the external recording medium with a communication function 210 starts transfer by wireless communication of the JPEG file 300 stored in the DCIM directory of the recording unit 212 to the external device with which communication is established. At this time, the communication unit 218 takes only files in JPEG format that are stored under the DCIM directory as the transfer objects, and transfer of files stored under the TEMP directory is not performed. Further, the communication unit 218 selectively transfers non-transferred files that are stored under the DCIM directory. For example, the communication unit 218 stores the file named of transferred files, and selects non-transferred files among the files stored under the DCIM directory based on the stored file names.

Next, in S507, the system control unit 50 determines whether or not transfer of the JPEG file 300 to the external device from the external recording medium with a communication function 210 has ended. For example, after sending the transfer-activating command in S506, in S507 the system control unit 50 sends a command requesting the communication status to the external recording medium with a communication function 210. For example, sending of this command is repeatedly performed at predetermined intervals. The system control unit 50 then stands by for the external recording medium with a communication function 210 to return, in response to this command, the communication status that indicates that transfer of the JPEG file 300 has ended.

Upon receiving a communication status that indicates that file transfer has ended from the external recording medium with a communication function 210 in S507, the system control unit 50 moves the processing to S508. In S508, the system control unit 50 creates the complex image file 400 from the JPEG file 300 and the JPEG file made with primary image data that were generated in the aforementioned S504 and S505, respectively, and written into the external recording medium with a communication function 210.

As one example, the system control unit 50 reads out the JPEG file 300 stored under the DCIM directory from the external recording medium with a communication function 210, and stores the JPEG file 300 in the memory 30. Further, the system control unit 50 reads out from the external recording medium with a communication function 210 the JPEG file made with primary image data that corresponds to the JPEG file 300, that is stored under the TEMP directory, and stores the JPEG file in the memory 30.

The system control unit 50 extracts Exif information from the region 302 of the JPEG file 300 stored in the memory 30. The Exif information includes the second reduced image data to which compression encoding has been applied. The system control unit 50 also extracts the first reduced image data to which compression encoding has been applied from the region 303 of the JPEG file 300 stored in the memory 30. Further, the system control unit 50 extracts primary image data from the JPEG data made from the primary image data that is stored in the memory 30.

Subsequently, on the memory 30, the system control unit 50 forms the file header 401 and stores the Exif information extracted from the JPEG file 300 in the region 402 following the file header 401, and stores the first reduced image data in the region 403 that follows the region 402. Furthermore, the system control unit 50 stores the primary image data in the region 404 that follows the region 403. Thus, the complex image file 400 is created on the memory 30.

Next, in S509, the system control unit 50 rewrites the Exif information inside the region 402 of the complex image file 400 created on the memory 30 in S508, and moves the processing to S510. In S510, the system control unit 50 transfers the complex image file 400 on the memory 30 to the external recording medium with a communication function 210, and writes the complex image file 400 with a predetermined file name under the DCIM directory in the recording unit 212.

At this time, the system control unit 50 uses a file name that is the same as that of the JPEG file 300 in which the first and second reduced image data that are included in the complex image file 400 are stored as the file name of the complex image file 400. That is, the system control unit 50 overwrites the JPEG file 300 with the complex image file 400 in the external recording medium with a communication function 210.

In this case, after the aforementioned S506, the external recording medium with a communication function 210 has already transferred the JPEG file 300 to the external device by wireless communication. Consequently, in S510, the complex image file 400 that is written with the same file name as the JPEG file 300 under the DCIM directory of the external recording medium with a communication function 210 is not transferred to the external device.

When the complex image file 400 is written under the DCIM directory of the external recording medium with a communication function 210, the system control unit 50 deletes the JPEG file made with primary image data that is stored under the TEMP directory (S512). Thereby, the series of steps in the file transfer process is completed.

Although in the above description the JPEG file made with primary image data that is stored under the TEMP directory is deleted after the complex image file 400 is written to the external recording medium with a communication function 210, the deletion timing is not limited to this example. For example, the deletion may be performed in the aforementioned S508 at the time point when the JPEG file made with primary image data is read from the external recording medium with a communication function 210 and stored in the memory 30.

Although in the above description, the JPEG file 300 is always transferred in a case in which the external recording medium with a communication function 210 is attached to the digital camera 100 and wireless communication is established with an external device, transfer of the JPEG file 300 is not compulsory. More specifically, a case may also be considered in which the user needs to transfer the complex image file 400 including the primary image data from the external recording medium with a communication function 210 by wireless communication.

In this case, the need of the user can be satisfied by enabling the user to make a selection at the digital camera 100 regarding whether to transfer only the JPEG file 300 or to transfer the complex image file 400 including the primary image data. For example, a selection menu for selecting whether to transfer only the JPEG file 300 or to transfer the complex image file 400 including the primary image data may be provided in the digital camera 100.

More specifically, when the user has selected to transfer only the JPEG file 300 on the selection menu, the system control unit 50 performs still image photographing operations according to the flowchart in FIG. 5 as described above. In contrast, when the user has selected to transfer the complex image file 400 including the primary image data on the selection menu, the system control unit 50 performs still image photographing operations that are the same as a case in which an external recording medium without a communication function is attached to the digital camera 100. In this case, the system control unit 50 writes the complex image file 400 including the primary image data and the second reduced image data for which compression encoding has been applied under the DCIM directory of the external recording medium with a communication function 210.

Next, a case is considered in which the external recording medium with a communication function 210 on which recording of image data has been performed by the digital camera 100 of the present embodiment is attached to another device and used. In this case, it is assumed that a non-transferred JPEG file 300 made with first and second reduced image data that are generated based on original size image data and for which compression encoding has been applied are stored under the DCIM directory in the external recording medium with a communication function 210.

As described previously, according to the present embodiment a JPEG file made with primary image data is stored under a directory that is different to the DCIM directory for which file transferring is performed by the external recording medium with a communication function 210. Further, after transfer of the JPEG file 300, the complex image file 400 is created based on the primary image data and the first and second reduced image data. Consequently, even if the external recording medium with a communication function 210 in question is attached to another device, transferring of a non-transferred JPEG file 300 under the DCIM directory in the digital camera 100 can proceed.

Further, a case may be considered in which, after JPEG files 300 under the DCIM directory that had been non-transferred files at the digital camera 100 are all transferred with the other device in question, the external recording medium with a communication function 210 in question is attached to the digital camera 100. In this case, the digital camera 100 can create a complex image file 400 based on a JPEG file 300 that was transferred with the other device and a JPEG file made with primary image data that is under the TEMP directory that corresponds to the relevant JPEG file 300.

For example, the system control unit 50 determines whether or not a JPEG file made with primary image data exists under the TEMP directory when the external recording medium with a communication function 210 is attached to the digital camera 100. If the system control unit 50 determines that a JPEG file made with primary image data exists, the system control unit 50 assumes that the JPEG file 300 under the DCIM directory has already been transferred to an external device. Thus, the system control unit 50 creates a complex image file 400 from the JPEG file made with primary image data that is under the TEMP directory and the JPEG file 300 under the DCIM directory.

Although the present embodiment has been described as one in which image data acquired by photographing is stored in a complex image file 400, this is not compulsory. For example, according to the present embodiment, image data acquired by photographing may be stored in a conventional JPEG file.

In this case, the system control unit 50, for example, creates a JPEG file using original size image data acquired by photographing, and reduced image data that has a QQVGA resolution that is generated from the original size image data. The system control unit 50 writes the JPEG file under the TEMP directory of the external recording medium with a communication function 210. The system control unit 50 also creates another JPEG file that includes image data of only the reduced image data that is generated from the original size image data in question. The system control unit 50 writes this other JPEG file under the DCIM directory of the external recording medium with a communication function 210.

The external recording medium with a communication function 210 transfers the other JPEG file that is made with the reduced image data and stored under the DCIM directory by wireless communication. When transfer of the file is completed, the system control unit 50 uses the JPEG file stored under the TEMP directory to overwrite the corresponding other JPEG file that is stored under the DCIM directory.

Although in the above description the JPEG files 300 are transferred each time photographing is performed, this is not compulsory. More specifically, the present invention is also applicable to a case in which complex image files 400 are already recorded under the DCIM directory of the external recording medium with a communication function 210.

For example, a case will be considered in which photographing is performed in a state in which wireless communication between the external recording medium with a communication function 210 and an external device is not established. In this case, the system control unit 50 creates a complex image file 400 based on primary image data generated based on original size image data obtained by photographing and first and second reduced image data to which compression encoding has been applied, and stores the complex image file 400 under the DCIM directory.

Thereafter, if wireless communication is established between the external recording medium with a communication function 210 and an external device, the system control unit 50 sends a transfer-inactivating command to the external recording medium with a communication function 210. The system control unit 50 also extracts primary image data and first and second reduced image data to which compression encoding has been applied from the complex image file 400 stored under the DCIM directory. The system control unit 50 then generates a JPEG file using the extracted primary image data and stores the generated JPEG file under the TEMP directory, and generates a JPEG file 300 using the first and second reduced image data to which compression encoding has been applied and stored the generated JPEG file 300 under the DCIM directory.

Thereafter, the system control unit 50 executes the processing of S506 and the subsequent processing in the flowchart shown in FIG. 5. More specifically, the system control unit 50 sends a transfer-activating command to the external recording medium with a communication function 210 (S506), and transfers the JPEG file 300 under the DCIM directory to the external device (S507). The system control unit 50 also reconstructs a complex image file 400 based on the relevant JPEG file 300 and the JPEG file made with primary image data that is under the TEMP directory (S508, S509), and stores the complex image file 400 in the DCIM directory (S510). Further, the system control unit 50 deletes the JPEG file made with primary image data that is under the TEMP directory (S511).

A case may also arise in which a plurality of complex image files 400 are stored under the DCIM directory of the external recording medium with a communication function 210. In this case, before sending the transfer-activating command in S506, for each of the plurality of complex image files 400, the system control unit 50 extracts primary image data and first and second reduced image data to generate the respective files, and stores the files in a predetermined directory.

As described in the foregoing, according to the present embodiment, when using the external recording medium with a communication function 210 that is configured to automatically transfer JPEG files stored in a predetermined directory, it is possible to curb the time required for transferring data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-099404, filed on Apr. 15, 2009, which is hereby incorporated by reference herein its entirety.

What is claimed is:

1. A file management apparatus comprising:
a connection unit to which an external recording medium is to be attached, wherein the external recording medium comprises a storage unit and a communication unit, and wherein said storage unit has a first directory which is predetermined and a second directory which is different from the first directory, and the communication unit is configured to transfer a file stored in the first directory to an external device wirelessly and not to transfer a file stored in the second directory to the external device;
a control unit that controls read and/or write of a file from/to said storage unit of said external recording medium that is attached to said connection unit;
an acquisition unit that acquires first image data;
a generation unit that reduces an image size of the first image data to generate second image data, in response to the acquisition of the first image data by the acquisition unit, and
wherein, when the acquisition unit acquires the first image data, said control unit stores a first image file, in which the first image data is included, in the second directory of said storage unit, and stores a second image file, in which the second image data is included, in the first directory of said storage unit.

2. The file management apparatus according to claim 1, wherein said control unit further controls the storage unit to store the first image data and the second image data in a third image file after a transfer of the second image file stored in the first directory is completed, and to store the third image file in the first directory.

3. The file management apparatus according to claim 2, wherein:
   said communication unit of said external recording medium is capable of outputting status information relating to a transfer of a file stored in the first directory; and
   said control unit determines an end of the transfer of the second image file based on the status information that is output from said communication unit.

4. The file management apparatus according to claim 2, wherein:
   said control unit selects, in accordance with a user operation, whether to store the first image file and the second image file in the second directory and the first directory, respectively, or to store the third image file in the first directory without generating the first and second image files.

5. The file management apparatus according to claim 2, wherein said control unit overwrites the second image file stored in the first directory of said storage unit with the third image file.

6. The file management apparatus according to claim 1, further comprising an image capturing unit, and
   wherein said generation unit generates the first and second image files in response to an image capture performed by said image capturing unit; and
   wherein said control unit stores the first image file in the second directory, and stores the second image file in the first directory.

7. A control method of a file management apparatus comprising a connection unit to which an external recording medium is to be attached, wherein the external recording medium comprises a storage unit and a communication unit, and wherein said storage unit has a first directory which is predetermined and a second directory which is different from the first directory, and the communication unit is configured to transfer a file stored in the first directory to an external device wirelessly and not to transfer a file stored in the second directory to the external device, the method comprising:
   a control step of controlling read and/or write of a file from/to said storage unit of said external recording medium that is attached to said connection unit;
   an acquisition step of acquiring first image data;
   a generation step of generating second image data by reducing an image size of the first image data, in response to the acquisition of the first image data in the acquisition step, and
   wherein, when the first image data is acquired in the acquisition step, the control step controls the storage unit to store a first image file in which the first image data is included in the second directory in said storage unit, and to store a second image file in which is included the second image data in the first directory of the storage unit.

\* \* \* \* \*